(No Model.) 3 Sheets—Sheet 2.
W. J. WALLIS.
AUTOMATIC CORN PLANTER.
No. 395,674. Patented Jan. 1, 1889.
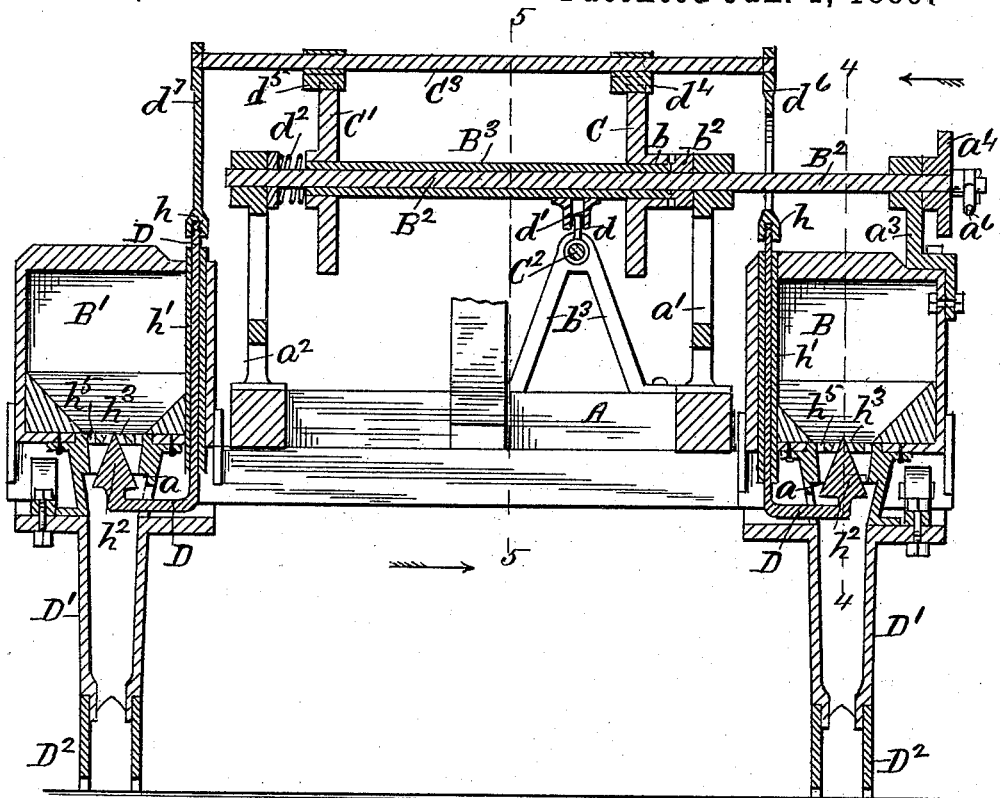
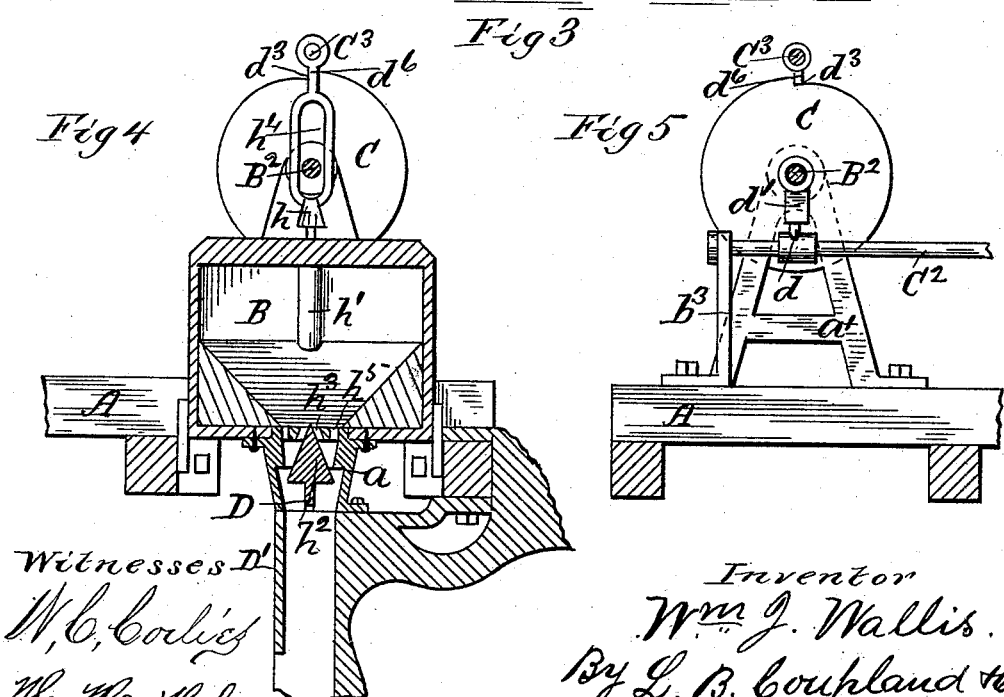
Witnesses
W. C. Corlies
M. H. Mahon
Inventor
Wm. J. Wallis.
By L. B. Coupland & Co.
attys.

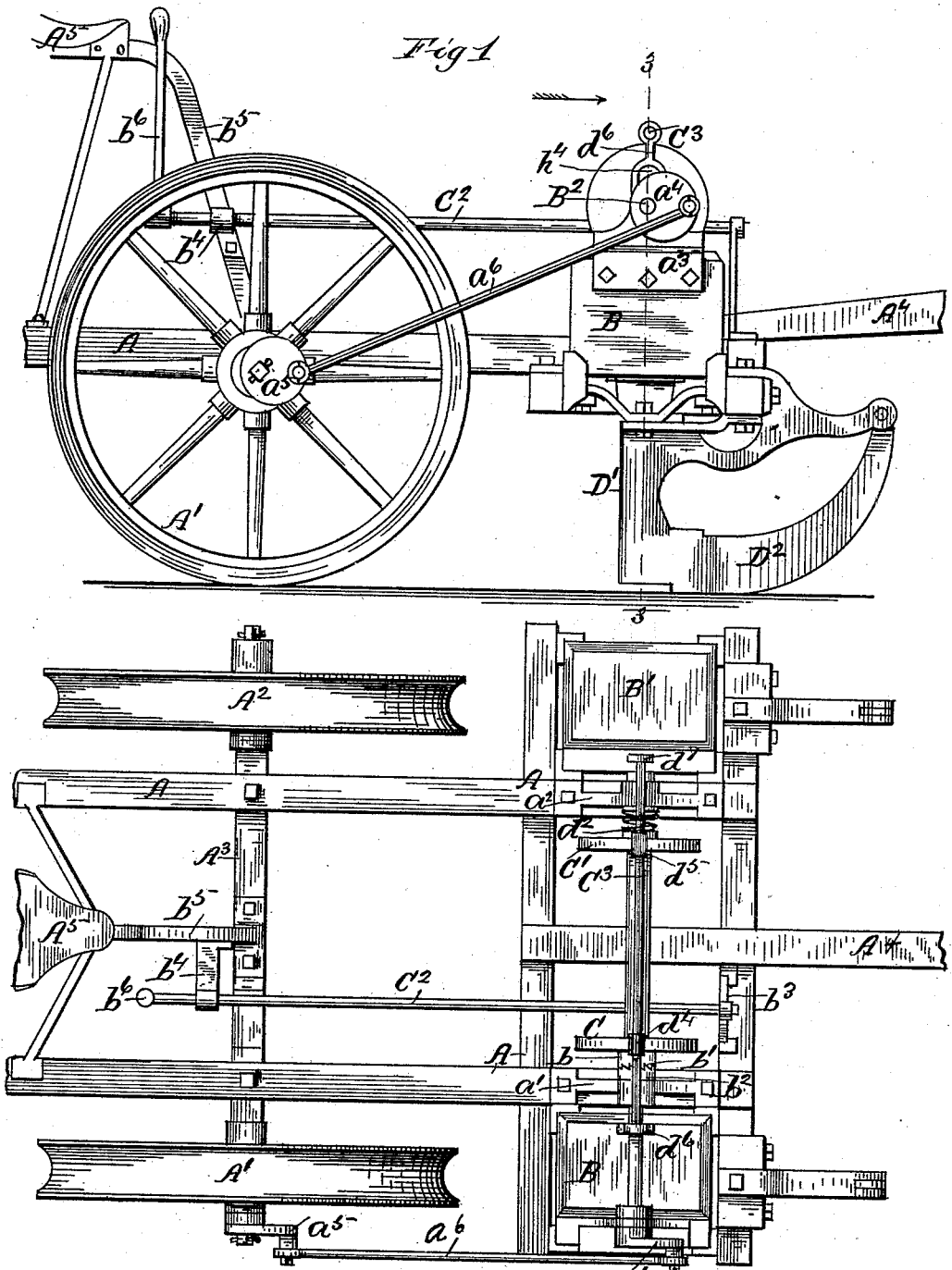

(No Model.)   3 Sheets—Sheet 3.
W. J. WALLIS.
AUTOMATIC CORN PLANTER.
No. 395,674.   Patented Jan. 1, 1889.
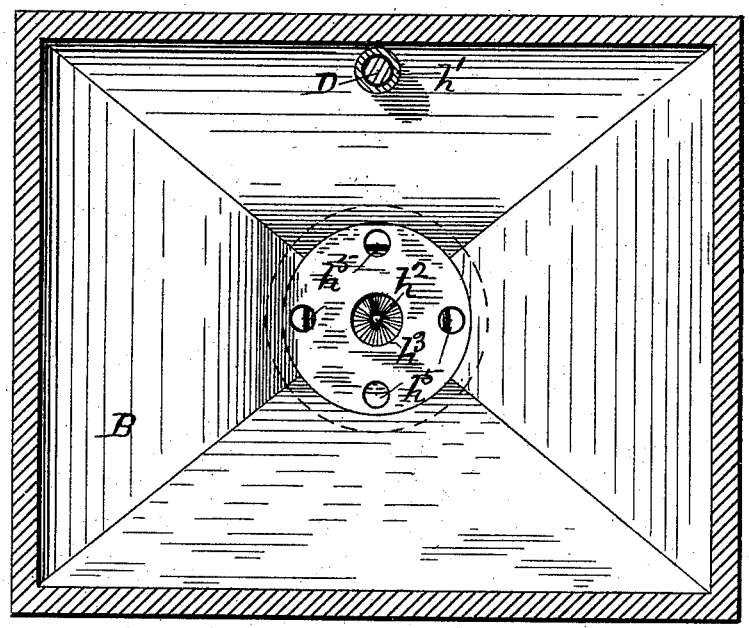
Fig 6
Fig 7
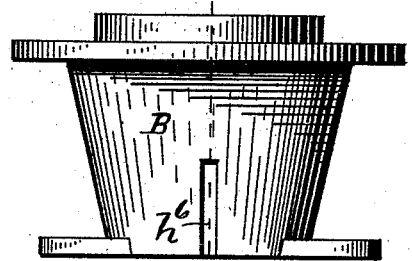
Fig 9
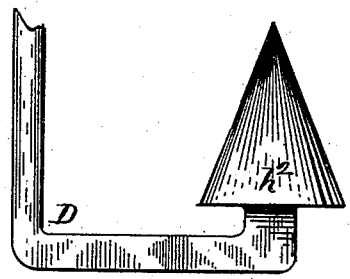
Fig 8
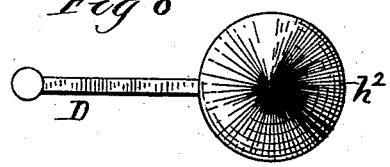
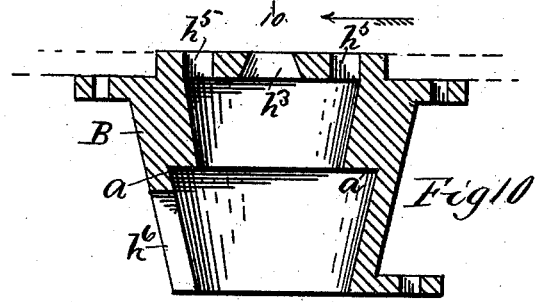
Fig 10
Witnesses,
W. C. Corliss.
H. McMahon
Inventor
Wm J. Wallis.
By L. B. Coupland & Co.
attys.

UNITED STATES PATENT OFFICE.

WILLIAM J. WALLIS, OF CHICAGO, ILLINOIS, ASSIGNOR OF ONE-HALF TO HENRY WULFF, OF SAME PLACE.

AUTOMATIC CORN-PLANTER.

SPECIFICATION forming part of Letters Patent No. 395,674, dated January 1, 1889.

Application filed September 18, 1888. Serial No. 285,749. (No model.)

*To all whom it may concern:*

Be it known that I, WILLIAM J. WALLIS, of Chicago, county of Cook, and State of Illinois, have invented certain new and useful Improvements in Automatic Corn-Planters, of which the following is a full, clear, and exact description, that will enable others to make and use the same, reference being had to the accompanying drawings, forming a part of this specification.

This invention relates to improvements in the class of sulky or wheel planters for dropping the seed in hills; and the same consists of certain novel features in the construction, arrangement, and operation of the different parts, as will be hereinafter set forth.

The machine is more especially intended as a corn-planter, but may be used in planting peas, beans, and other seeds with the same facility, and is designed to plant two rows at the same time.

Figure 1 is a side elevation of a planter embodying my improved features; Fig. 2, a plan; Fig. 3, a vertical transverse section in plane 3, Fig. 1; Fig. 4, a vertical longitudinal section in plane 4, Fig. 3; Fig. 5, a vertical longitudinal section in plane 5, Fig. 3; Fig. 6, an enlarged section and plan of one of the seed-boxes; Fig. 7, a broken side elevation of a feed-lever; Fig. 8, a plan of the same; Fig. 9, an elevation of a seed-box; and Fig. 10, a vertical section of the same in plane 10, Fig. 9.

Referring to the drawings, A represents the several parts of the machine-frame; $A'$ $A^2$, the sulky-wheels; $A^3$, the axle; $A^4$, the draft pole or tongue, and $A^5$ the driver's seat.

The seed-boxes B B' are suitably supported on the frame-work in advance of the sulky-wheels. These boxes are constructed with the interior offset or shoulder, $a$, in the seed-passage, (see Fig. 10,) the object of which will be hereinafter set forth.

The standards $a'$ $a^2$ are secured to the frame between the seed-boxes, as shown in Figs. 2 and 3. The transverse driving-shaft $B^2$ is provided with journal-bearings in said standards and in the bracket $a^3$, bolted to the seed-box B. On one end of the shaft $B^2$ is eccentrically and rigidly mounted the crank-wheel $a^4$. A companion crank-wheel, $a^5$, is rigidly secured to the hub of the wheel $A'$, (see Figs. 1 and 2,) said crank-wheels being connected by means of the rod $a^6$, by which means the required rotary motion is transmitted to the shaft $B^2$ from the sulky-wheel $A'$.

$B^3$ is a sleeve or hollow shaft loosely mounted on the shaft $B^2$ between the supporting-standards $a'$ $a^2$, as shown in Fig. 3. On the respective ends of the sleeve $B^3$ are rigidly mounted the disk-wheels C C'. The outer end of the hub $b$ of the disk C is provided with ratchet-teeth $b'$, (see Fig. 2,) which are adapted to engage with the corresponding ratchet or clutch collar $b^2$, rigidly mounted on the shaft $B^2$.

The front end of the horizontal rod $C^2$ is supported by the standard $b^3$ and the rear end by the bracket $b^4$, secured to the seat-standard $b^5$, as shown in Figs. 1 and 2. The vertical lever $b^6$ is mounted on the rear end of the rod $C^2$ and is arranged within convenient reach of the driver. Projecting upward from that part of the rod $C^2$ directly underneath the sleeve $B^3$ is a pin or post, $d$, which comes between the lugs $d'$, (see Fig. 3,) whereby a rocking movement of the rod $C^2$ imparts an endwise movement to the sleeve $B^3$ and stops the rotary motion of the same by throwing the clutch mechanism out of engagement. The spring $d^2$, coiled around the shaft $B^2$ and bearing against the end of the sleeve, serves to normally hold said sleeve in an engaged position, so that the same will rotate with the shaft carrying the same.

The disk-wheels C C' are provided on their peripheries with the recess $d^3$. Above these disks is located the shaft $C^3$, having collars $d^4$ $d^5$ rigidly mounted thereon, and which rest upon and have frictional contact with the periphery of the disk-wheels. The outer ends of the shaft $C^3$ are loosely supported in the upper ends of the arms $d^6$ $d^7$, so that said shaft may have a rolling contact and lessen the friction on the disk-wheels. The lower ends of the arms $d^6$ $d^7$ are provided with the interiorly-threaded boss $h$, with which the upper threaded ends of the angular dropping-levers D engage, as shown in Fig. 3. The levers D pass down through and close to one side of the seed-boxes, and are prevented from having contact with the contents of the boxes by means of the tubes $h'$. The lower ends of the angle-levers D are bent at right angles and terminate in the conical head $h^2$, the point of the cone passing upward from the under side into the central aperture, $h^3$, in the bottom of the seed-boxes, the lower and gradually-enlarging part of the conical head having contact with the offset or annular shoulder when the seed-passage is to be closed.

D' are the seed-tubes, and $D^2$ the usual runners used on this class of planters.

The arm $d^6$ is provided with the elongated aperture $h^4$, so as to permit of a free vertical movement and keep from contact with the shaft B.

The bottoms of the seed-boxes (see Fig. 6) are provided with a number of seed-apertures, $h^5$, the diameter of which will correspond to that of the size of the seed, so that but one grain can pass through at a time. The slot $h^6$ in one side of the seed-boxes provides for a vertical movement of the angular seed-dropping levers D.

The diameter of the disks C C' will determine the distance between hills and the time of dropping the seed, so that larger or smaller disks may be used, as circumstances require.

In operation the conical head on the dropping-lever normally closes the seed-passage, the lever being in its highest position, and so remains until the disk-wheels C C' roll around and bring the recess $d^3$ under the shaft $C^3$, when the same drops into the recess and momentarily opens the seed-passage by causing the lever D to drop, the seeds passing down around the cone-shaped head, the passage being closed when the disk-wheels have rotated far enough to raise the shaft $C^3$ out of the recess $d^3$. Thus the operation of dropping the seed is performed once in each revolution of the dropping mechanism. When the end of the row is reached, the dropping mechanism is thrown out of engagement by imparting a rocking movement to the rod $C^2$ through the medium of the handle-lever $b^6$.

Having thus described my invention, what I claim, and desire to secure by Letters Patent, is—

1. In a planting-machine, the combination, with one of the sulky-wheels, of a crank-wheel rigidly secured to the hub thereof, the shaft $B^2$, a companion crank-wheel mounted on one end of said shaft, a rod connecting said crank-wheels, a sleeve loosely mounted on the shaft $B^2$, the disk-wheels C C', rigidly mounted on said sleeve, the ratchet-toothed hub $b$, the corresponding ratchet-collar, $b^2$, rigidly mounted on the shaft $B^2$, and the means described for engaging and disengaging said clutch mechanism, substantially as and for the purpose set forth.

2. In a planting-machine, the combination, with a sleeve or hollow shaft provided with lugs and mounted on a rotating shaft, of the rocking rod $C^2$, having the lever $b^6$ mounted on the rear end thereof and provided with the pin $d$ near the front end, said pin engaging with said lugs, whereby an endwise movement may be imparted to said sleeve, substantially as and for the purpose set forth.

3. In a planting-machine, the combination, with the driving-shaft, of the sleeve $B^3$, mounted thereon, the disk-wheels C C', provided on their respective peripheries with a recess, $d^3$, the shaft $C^3$, located above and resting on top of said disk-wheels, the arms $d^6$ and $d^7$, having their upper ends mounted on the respective ends of the shaft $C^3$ and their lower ends provided with an interiorly-threaded boss, the angular dropping-levers D, the upper ends whereof have a threaded engagement with said boss, the lower ends being bent at right angles and terminating in the conical head $h^2$, and the seed-boxes provided in the seed-passage with the offset $a$, and the central aperture, $h^3$, surrounded by a number of lesser apertures for the passage of the seed, substantially as and for the purpose set forth.

WILLIAM J. WALLIS.

Witnesses:
 GEO. G. BELLOWS,
 J. B. DONALSON.